(12) United States Patent
Ishihara

(10) Patent No.: US 6,577,359 B2
(45) Date of Patent: Jun. 10, 2003

(54) LIQUID CRYSTAL DISPLAY APPARATUS WITH LIGHT GUIDE PANEL HAVING LIGHT-ABSORBING OR LIGHT-STORING LAYER

(75) Inventor: Takayuki Ishihara, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 36 days.

(21) Appl. No.: 09/731,764

(22) Filed: Apr. 18, 2001

(65) Prior Publication Data

US 2001/0024253 A1 Sep. 27, 2001

(30) Foreign Application Priority Data

Dec. 10, 1999 (JP) .......................... 11-351666
Dec. 22, 1999 (JP) .......................... 11-364186

(51) Int. Cl.[7] .......................... G02F 1/1335
(52) U.S. Cl. .................. 349/63; 349/62; 349/65; 349/71; 362/31
(58) Field of Search .................. 349/62, 63, 65, 349/70, 71; 362/31

(56) References Cited

FOREIGN PATENT DOCUMENTS

| JP | 09-237514 | 9/1997 | ............. F21V/8/00 |
|---|---|---|---|
| JP | 10-188636 | 7/1998 | ............. F21V/8/00 |
| JP | 10326515 A | * 12/1998 | ......... G02F/1/1335 |

OTHER PUBLICATIONS

English Language Abstracts of Japanese Pat.Appln. No. 10–188636 and 09–237514.

* cited by examiner

*Primary Examiner*—James Dudek
*Assistant Examiner*—Andrew Schechter
(74) *Attorney, Agent, or Firm*—Michael D. Bednarek; Shaw Pittman LLP

(57) ABSTRACT

A liquid crystal display apparatus includes a liquid crystal panel, a transparent light guide panel disposed in front of the liquid crystal panel and having one irregular surface for emitting light entering from a light source toward the liquid crystal panel, and a reflector disposed behind the liquid crystal panel for reflecting light passing through the light guide panel and the liquid crystal panel toward the liquid crystal panel and the light guide panel. The irregular surface of the light guide panel is partially formed with an absorbing layer for absorbing external light or a light storing layer for storing light.

15 Claims, 11 Drawing Sheets

LIQUID CRYSTAL DISPLAY APPARATUS WITH LIGHT GUIDE PANEL HAVING LIGHT-ABSORBING OR LIGHT-STORING LAYER

BACKGROUND OF THE INVENTION

1. Field of the Invention

The present invention relates to a reflective liquid crystal display apparatus of a front-lighting type.

2. Description of the Related Art

Conventional liquid crystal display apparatuses include a semitransparent type liquid crystal display apparatus having a back lighter. In such a liquid crystal display apparatus, light from the back lighter arranged behind the liquid crystal panel travels through a semitransparent reflector to the back side of the liquid crystal panel.

Recently, a semitransparent type liquid crystal display apparatus having a front lighter has been proposed. FIG. 11 illustrates an example of such a liquid crystal display apparatus. The liquid crystal display apparatus D includes a liquid crystal panel 41 which comprises a pair of transparent plates 40a, 40b, and liquid crystal C filled therebetween. The liquid crystal panel 41 has a front surface (upper surface in this figure) on which a first polarizer 43a and a light guide panel 42 are disposed, and a rear surface on which a second polarizer 43b and a reflector 44 are disposed.

The light guide panel 42 may be a transparent, generally planar plate, but has one surface which is formed with a plurality of projections 45. Each of the projections 45 is triangular, in cross section, including a first inclined surface 45a and a second inclined surface 45b which are different in the direction and angle of inclination. The projections 45, each of which extends in the widthwise direction of the light guide plate 42, are constantly spaced in a predetermined direction. Point light sources 46 are provided beside the light guide plate 42.

With the liquid crystal display apparatus D, when the light sources 46 are turned on to perform image display, light from the light sources 46 travels within the light guide panel 42 while being totally reflected by the inner surfaces of the projections 45 of the light guide panel 42. The light reflected by the projections 45 exits the light guide panel downwardly to enter the first polarizer 43a, the liquid crystal panel 41, and the second polarizer 43b, and is then reflected upwardly by the reflector 44. The light reflected by the reflector 44 travels again through the second polarizer 43b, the liquid crystal panel 41 and the first polarizer 43a to be emitted to the front side of the liquid crystal display apparatus D.

On the other hand, when image display is performed utilizing external light (e.g. sunlight or light from interior lighting) only, the external light travels downwardly to penetrate the light guide panel 42, the first polarizer 43a, the liquid crystal panel 41 and the second polarizer 43b. The light is then reflected by the reflector 44 upwardly to travel again through the second polarizer 43b, the liquid crystal panel 41, the first polarizer 43a and the light guide panel 42 to be emitted to the front side of the liquid crystal display apparatus D.

With the above-described liquid crystal display apparatus D in which the light guide panel 42 is formed with projections on its front surface, visibility of the display may often be deteriorated depending on the direction in which the user views the display. For example, in the case where the user views the liquid crystal panel 41 obliquely from the upper right in FIG. 11 (See an arrow E), external light impinging on the light guide panel 42 is partially reflected by the second inclined surfaces 45b of the projections 45 and then by the first inclined surfaces 45a to travel toward the user's eyes.

Further, when the light sources 46 are turned on, light from the light sources 46 enters the light guide panel 42 to be totally reflected within the light guide panel 42. At that time, however, the light vertically impinging on the second inclined surfaces 45b is not totally reflected by the second inclined surfaces 45 but exits the light guide panel 42 to travel toward the user's eyes. As a result, the contrast at the liquid crystal panel 41 is deteriorated, which leads to deteriorated visibility. Such a problem is peculiar to the liquid crystal display apparatus D which includes the light guide panel 42 formed with projections 45.

In the above-described liquid crystal display apparatus D, external light or light from the light sources 46 is utilized to view the liquid crystal panel 41, as described above. However, in the case where a mobile phone, for example, incorporating the liquid crystal display apparatus D is used utilizing sunlight and the user moves from a light place with sunlight to a dark place such as shade, it may be impossible to obtain sufficient light for visibility at the liquid crystal panel 41. Therefore, it is difficult for the user to view the letters or images displayed at the liquid crystal panel 41, so that the light sources 46 need to be turned on. In this way, the mobile phone incorporating the above-described liquid crystal display apparatus D is not conveniently usable.

SUMMARY OF THE INVENTION

It is therefore an object of the present invention to provide a liquid crystal display apparatus which is capable of eliminating or reducing the problems described above.

In accordance with a first aspect of the present invention, there is provided a liquid crystal display apparatus comprising: a liquid crystal panel; a transparent light guide panel disposed in front of the liquid crystal panel and having at least one irregular surface for emitting light entering from a light source toward the liquid crystal panel; and a reflector disposed behind the liquid crystal panel for reflecting light passing through the light guide panel and the liquid crystal panel toward the liquid crystal panel and the light guide panel; wherein the irregular surface of the light guide panel is partially formed with an absorbing layer for absorbing external light.

In the prior art structure which is not provided with an absorbing layer, external light may be reflected on the light guide panel to deteriorate the visibility depending on the direction in which the user views the liquid crystal panel. However, in accordance with the present invention, the light guide panel has a surface which is partially formed with an absorbing layer for absorbing external light. Therefore, the external light impinging on the absorbing layer of the light guide panel is absorbed by the layer without being reflected. Thus, the absorbing layer prevents the contrast deterioration to enhance the display quality of the liquid crystal panel.

Preferably, the irregular surface of the light guide panel may include a plurality of projections each of which is triangular in cross section with two inclined surfaces differing from each other in direction and angle of inclination, and the absorbing layer may be provided on a steeper inclined surface of each projection.

Preferably, the absorbing layer may be formed by applying a black coating onto the steeper inclined surface.

The steeper inclined surface of each said projection may be located farther away from the light source than the other inclined surface.

Alternatively, the steeper inclined surface of each said projection may be located closer to the light source than the other inclined surface.

Preferably, the irregular surface of the light guide panel may include a plurality of cylindrical projections each having a circumferential side surface on which the absorbing layer is formed.

The irregular surface of the light guide panel may be oriented away from the liquid crystal panel.

The irregular surface of the light guide panel may face toward the liquid crystal panel.

In accordance with a second aspect of the present invention, there is provided a liquid crystal display apparatus comprising a liquid crystal panel; a transparent light guide panel disposed in front of the liquid crystal panel and having at least one irregular surface for emitting light entering from a light source toward the liquid crystal panel; and a reflector disposed behind the liquid crystal panel for reflecting light passing through the light guide panel and the liquid crystal panel toward the liquid crystal panel and the light guide panel; wherein the irregular surface of the light guide panel is partially formed with a light storing layer for storing light.

With this structure, since the light guide panel 1 has a surface which is partially formed with a light storing layer, external light or light from the light source impinging on the light storing layer is stored at this layer. When the liquid crystal panel is used in a dark place with the light thus stored, the stored light is emitted from the light storing layer to illuminate the liquid crystal panel. Therefore, the letters or the image displayed on the liquid crystal panel can be viewed by the user. When the user moves from a light place to a dark place for example, the liquid crystal panel is illuminated with the light emitted from the light storing layer so that there is no need for turning on the light source. Therefore, a mobile phone for example may incorporate such a liquid crystal display apparatus for improving convenience of its use.

Preferably, the irregular surface of the light guide panel may include a plurality of projections each of which is triangular in cross section with two inclined surfaces differing from each other in direction and angle of inclination, and the light storing layer may be provided at a steeper inclined surface of each projection.

Preferably, the light storing layer may be formed by applying a light storing coating material onto the steeper inclined surface.

The light guide panel may have at least one side surface provided with a light storing layer.

The steeper inclined surface of each said projection may be located farther away from the light source than the other inclined surface.

Alternatively, the steeper inclined surface of each said projection may be located closer to the light source than the other inclined surface.

Preferably, the irregular surface of the light guide panel may include a plurality of cylindrical projections having a circumferential side surface on which the light storing layer is formed.

Preferably, the irregular surface of the light guide panel may be oriented away from the liquid crystal panel.

The irregular surface of the light guide panel may face toward the liquid crystal panel.

Other features and advantages of the present invention will become clearer from the detailed description given below with reference to the accompanying drawings.

DETAILED DESCRIPTION OF THE PREFERRED EMBODIMENTS

Preferred embodiments of the present invention will be described below in detail with reference to the accompanying drawings. Throughout the drawings, the elements which are identical or similar are designated by the same reference signs.

Figure 1:
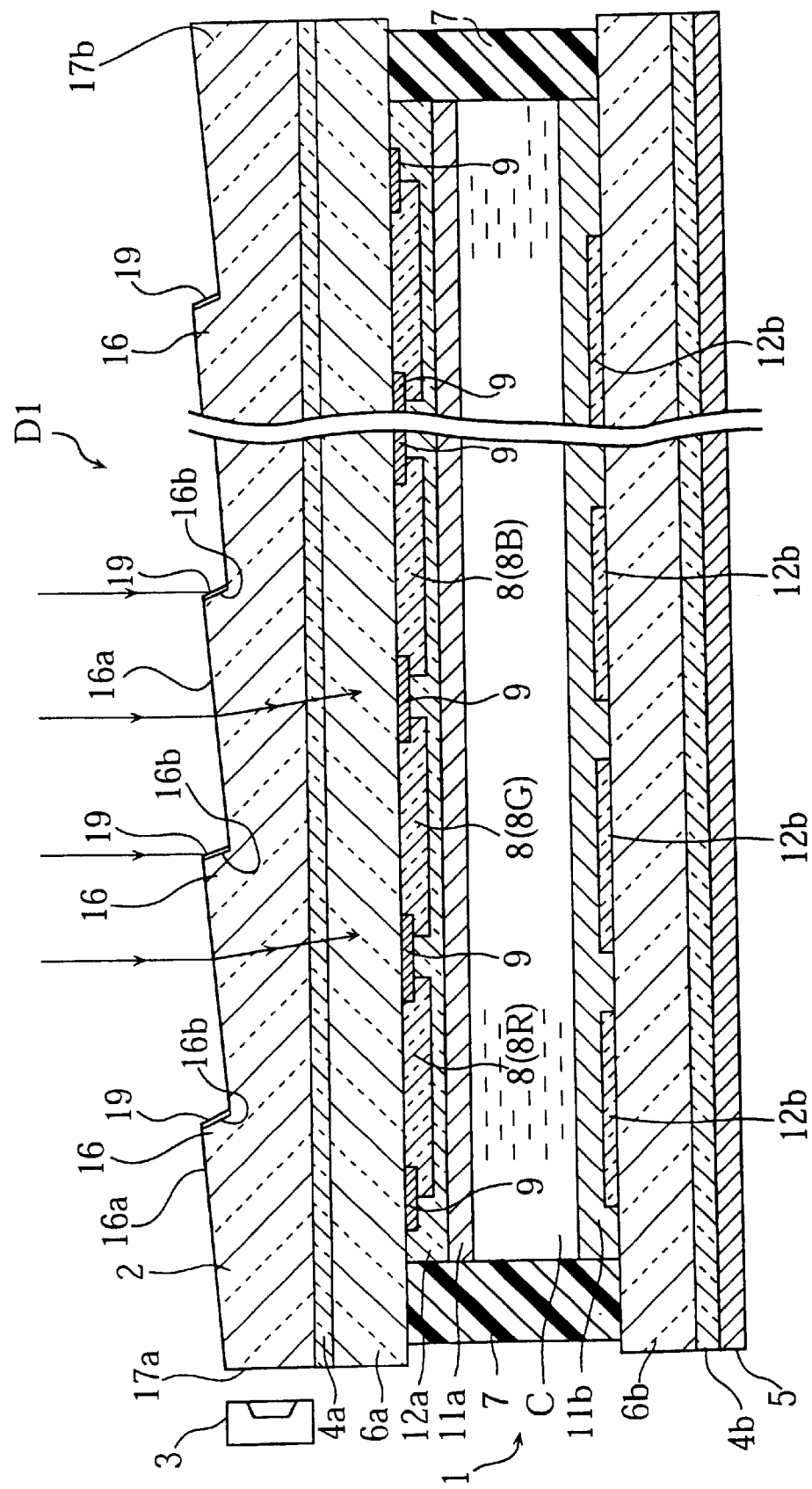
FIG. 1 is a sectional view showing a liquid crystal display apparatus in accordance with a first embodiment of the present invention.
Figure 2:
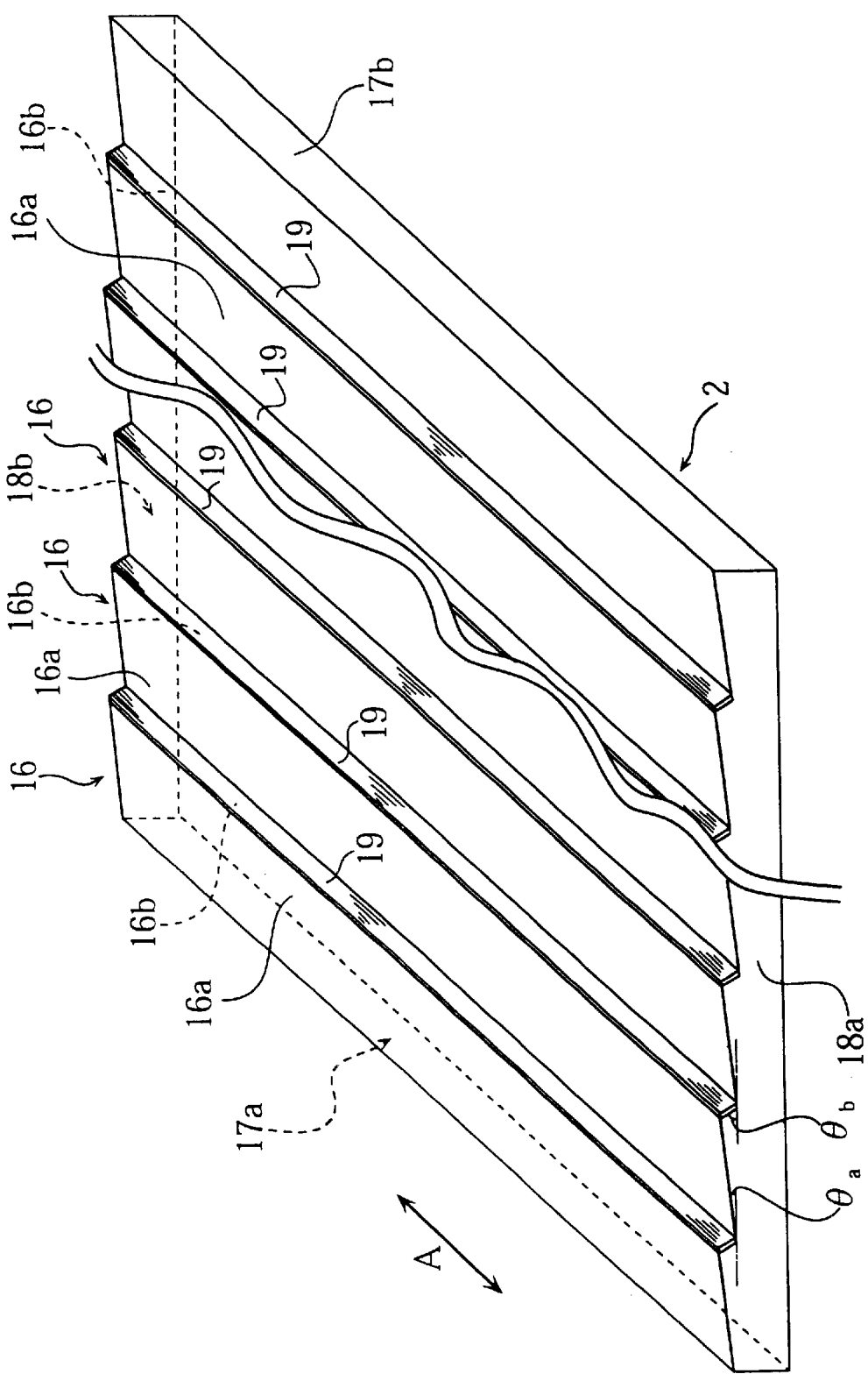
FIG. 2 is a schematic view of a light guide panel used in the liquid crystal display apparatus shown in FIG. 1.

First, reference is made to FIGS. 1 and 2. These figures illustrate a liquid crystal display apparatus of front-lighting type in accordance with a first embodiment of the present invention. The liquid crystal display apparatus D1 comprises a liquid crystal panel 1, a first polarizer 4a provided on the front surface (upper surface in this figure) of the liquid crystal panel 1, a light guide panel 2 provided on a front surface of the first polarizer 4a, light sources 3 for emitting light to the light guide panel 2, a second polarizer 4b provided on the rear surface of the liquid crystal panel 1, and a reflector 5 provided on the rear surface of the second polarizer 4b.

The liquid crystal panel 1 comprises a first transparent plate 6a, a second transparent plate 6b, a seal member 7 and liquid crystal C sealed in a space defined by these members. The transparent plates 6a, 6b may be made of glass material for example. The liquid crystal panel 1 may have color display function. In such a case, red, green and blue color filters 8 (8R, 8G, 8B) maybe provided on the first transparent plate 6a in a matrix arrangement. Further, for providing sharp image display, a black matrix 9 may be provided between the color filters. The liquid crystal panel 1 may only have monochrome display function.

The first transparent plate 6a is provided with an alignment layer 11a for twisting liquid crystal molecules, and a common transparent electrode 12a. Similarly, the second transparent plate 6b is provided with an alignment layer 11b and individual transparent electrodes 12b. The liquid crystal panel 1 may employ active matrix driving method, in which one liquid crystal cell is provided with a non-illustrated thin film transistor (TFT) for keeping the voltage applied to the liquid crystal cell.

A suitable number of the light sources 3, each of which is a point light source comprising an LED for example, are arranged adjacent to a side surface 17a of the light guide panel 2 extending in the widthwise direction A of the light guide panel 2. The LED light sources may be replaced by a cold cathode tube extending along the side surface 17a of the light guide panel 2. Thus, the kind of the light sources are not limitative in the illustrated embodiment.

The light guide panel 2 is in the form of a generally planar plate and may be made of polycarbonate or PMMA (polymethyl methacrylate (methacrylate resin) having high transparency. From a macroscopic viewpoint, the light guide panel 2 in this embodiment has a substantially constant thickness. Alternatively, however, the light guide panel 2 may reduce in thickness as it extends farther from the light sources 3.

On the other hand, from a microscopic viewpoint, the light guide panel 2 has a planer rear surface (lower surface in the figure) and an irregular front surface (upper surface) Specifically, the front surface of the light guide panel 2 is formed with a plurality of minute projections 16 arranged at a predetermined pitch (e.g. 100~200 µm) in a direction in which light from the light sources 3 enters the light guide panel 2. Each of the projection 16 has a triangular cross section defined by a first inclined surface 16a and a second inclined surface 16b which are different in the direction and angle of inclination. Each of the projections 16 extends in a direction (indicated by an arrow A in FIG. 2) which crosses the direction in which light travels from the light sources 3 to the light guide panel 2.

The inclination angle θa (See FIG. 2) of the first inclined surface 16a which is closer to the light sources 3 is smaller than the inclination angle θb (See FIG. 2) of the second inclined surface 16b which is farther from the light sources 3. As a result, the first inclined surface 16a has a larger area than that of the second inclined surface 16b.

The inclination angle θa of the first inclined surface 16a of each projection 16 is so set as to provide proper contrast within the effective viewing angle. The effective viewing angle refers to the angle within which the liquid crystal panel 1 can be well viewed by a user.

Generally, in a liquid crystal display apparatus, the extent of refraction of light traveling along the longer axes of the liquid crystal molecules is different from that of light traveling along the shorter axes of the liquid crystal molecules. Therefore, when the liquid crystal panel is viewed obliquely, the contrast at the liquid crystal panel 1 is lower than when the liquid crystal panel is viewed vertically from the front. Thus, to obtain a suitable contrast, it is necessary for the user to view the liquid crystal panel within the effective viewing angle. In this embodiment, the inclination angle θa of the first inclined surface 16a is set within a range of 1~10° for example. Therefore, the user can view the liquid crystal panel 1 with suitable contrast.

The liquid crystal display apparatus D1 is further formed, at a portion on the front surface of the light guide panel 2, with an absorbing layer 19 for absorbing external light. Specifically, the absorbing layer 19 extends in the direction of the arrow A in such a manner as to cover the almost entirety of the second inclined surface 16b of each projection 16, as shown in FIG. 2. The absorbing layer 19 may be provided by applying a black coating for example.

In the case where such an absorbing layer is not provided, external light impinging on the second inclined surface 16b is reflected sidewise to impinge on the adjacent first inclined surface 16a, and is reflected thereon upwardly to travel toward the user's eyes, causing contrast deterioration. In the illustrated embodiment, however, light impinging on the absorbing layer 19 formed on the inclined surface 16b is absorbed by the absorbing layer 19 without being reflected. Therefore, it is possible to prevent the contrast deterioration caused by reflection of external light, thereby enhancing the display quality of the liquid crystal display apparatus D1. Since the second inclined surface has a relatively small area as a result of the relatively large inclination angle θb, the absorbing layer 19 correspondingly has a relatively small area. Therefore, the display capability of the liquid crystal display apparatus is not deteriorated.

As a material for a black coating, use may be made of organic pigments or inorganic pigments such as carbon black, iron black and titanium black. The absorbing layer 19 is formed by dissolving any of these materials in a suitable organic solvent or resin for example, followed by applying and drying. The black coating is not limited to the above-described pigments. Further, the color of the coating is not limited to black. The only requirement for the coating is the capability of absorbing light incident thereon. Instead of applying a black coating, the inclined surface 16b may be blackened by intensity modulation of laser beam. The black coating needs not necessarily be applied to the entirety of the inclined surface 16b of the light guide panel 2, but may be applied to a selected portion of the inclined surface as required.

Each of the projections 16 may be so configured that the inclination angle of the first inclined surface 16a is greater than that of the second inclined surface 16b. In this case, the absorbing layer 19 is provided on the first inclined surface 16a. The projection 16 may extend transversely to the arrow A direction in FIG. 2.

The displaying operation of the liquid crystal panel 1 of the above-described liquid crystal display apparatus D1 will be described below.

In the case where display is performed utilizing external light (e.g. sunlight or light from interior lighting) only, most of the external light impinging on the light guide panel 2 penetrates the light guide panel 2 via the first inclined surfaces 16a. Thus, the light is emitted downwardly through the rear surface of the light guide panel 2 to become incident on the first polarizer 4a and the liquid crystal panel 1. On the other hand, external light impinging on the inclined surfaces 16b of the light guide panel 2 is absorbed by the absorbing layers 19 on the inclined surfaces 16b without being reflected.

The light incident on the liquid crystal panel 1 penetrates the liquid crystal panel and the second polarizer 4b, and is then reflected upwardly by the reflector 5. The light reflected by the reflector 5 penetrates again through the second polarizer 4b, the liquid crystal panel 1 and the first polarizer 4a to enter the light guide panel 2. Also at this time, the light entering the light guide panel 2 again is absorbed partially by the absorbing layer 19. However, most part of the light penetrates the light guide panel 2 via the first inclined surface 16a to be emitted to the front of the liquid crystal display apparatus 1. As a result, visible image display can be provided for the user. Moreover, clear image display can be provided because deterioration of contrast caused by light reflection on the inclined surfaces 16b can be avoided.

In the case where display is performed with the light sources turned on under external light, the above operation also applies with respect to the external light.

On the other hand, the light emitted from the light sources 3 enters the light guide panel 2 via the side surface 17a and travels toward the opposite side surface 17b and again toward the side surface 17a while being totally reflected repetitively within the light guide panel 2. During its travel, part of light incident on the rear surface of the light guide panel 2 at an angle smaller than the critical angle is emitted from the light guide panel 2 toward the liquid crystal panel 1. The light thus exiting the light guide panel 2 travels, in turn, through the first polarizer 4a, the liquid crystal panel 1, and the second polarizer 4b, and is then reflected upwardly by the reflector 5. The light reflected by the reflector 5 penetrates the second polarizer 4b, the liquid crystal panel 1 and the first polarizer 4a to be emitted to the front of the liquid crystal display apparatus D1, providing image display. At this time, since the external light impinging on the second inclined surface 16b is absorbed by the absorbing layer 19, it is possible to prevent the image display from becoming unclear due to the reflection of the external light.

In the case where the light sources 3 are turned on, some part of light emitted from the light source 3 impinges on and is absorbed by the absorbing layer 19. As a result, the light to be utilized for image display is reduced by that amount. However, the reduction in the amount of light does not provide significant adverse influence on the clarity of the image display, because proper contrast is provided by the provision of the absorbing layer 19 which prevents external light reflection. In this case, the total amount of light is larger than the case where only external light is utilized, so that the quality of image display is enhanced correspondingly.

In the first embodiment, the light sources 3 may be arranged in facing relationship with the side surface 17b. What must be considered in positioning the light sources 3 is the efficiency in utilizing light from the light sources 3.

Figure 3:
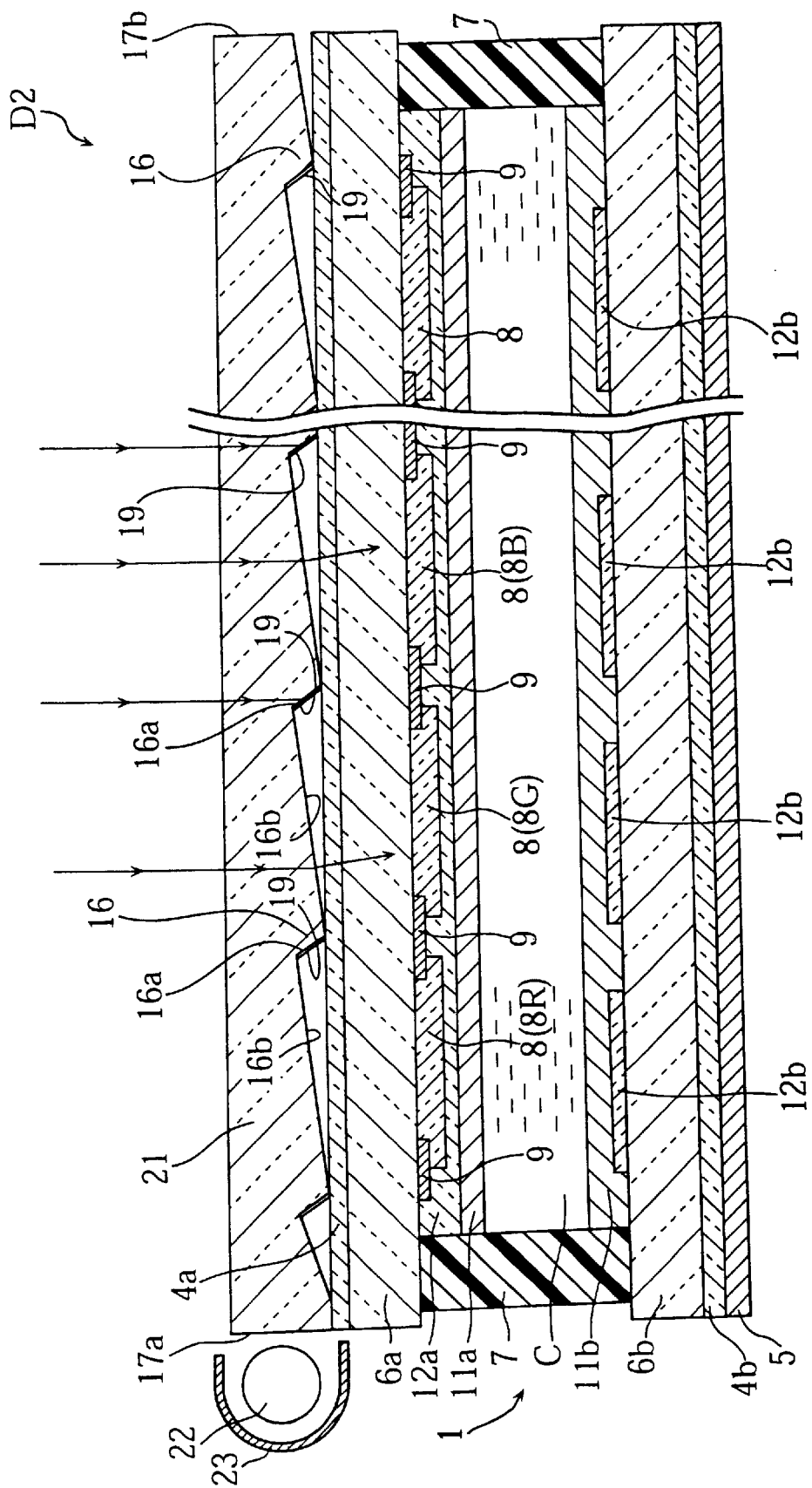
FIG. 3 is a sectional view showing a liquid crystal display apparatus in accordance with a second embodiment of the present invention.

FIG. 3 is a sectional view showing a liquid crystal display apparatus in accordance with a second embodiment of the present invention. This liquid crystal display apparatus D2 includes a light guide panel 21 which has a configuration provided by reversely arranging the front surface and the rear surface of the light guide panel 2 in the first embodiment. Specifically, the light guide panel 21 has a front surface (upper surface) which is planar and a rear surface (lower surface) which is formed with a plurality of projections 16. Each of the projections 16 has a first inclined surface 16a located farther from a light source 22 and a second inclined surface 16b located closer to the light sources. In the second embodiment, the inclination angle of the first inclined surface 16a is set larger, whereas the inclination angle of the second inclined surface 16b is set smaller. Each of the first inclined surface 16a is formed with an absorbing layer 19.

Further, in the second embodiment, a light source 22 comprising a cold cathode tube extending along a side surface 17a of the light guide panel 21 is employed instead of point light sources such as LED light sources. The cold cathode tube is surrounded by a reflector 23 for reflecting light emitted from the cold cathode tube toward the light guide panel 21.

Also in the second embodiment, the absorbing layer 19 is provided by applying a black coating on the first inclined surface 16a of each projection 16 on the rear surface of the light guide panel 21. Therefore, it is possible to obtain the same advantages as those obtained in the first embodiment.

Figure 4:
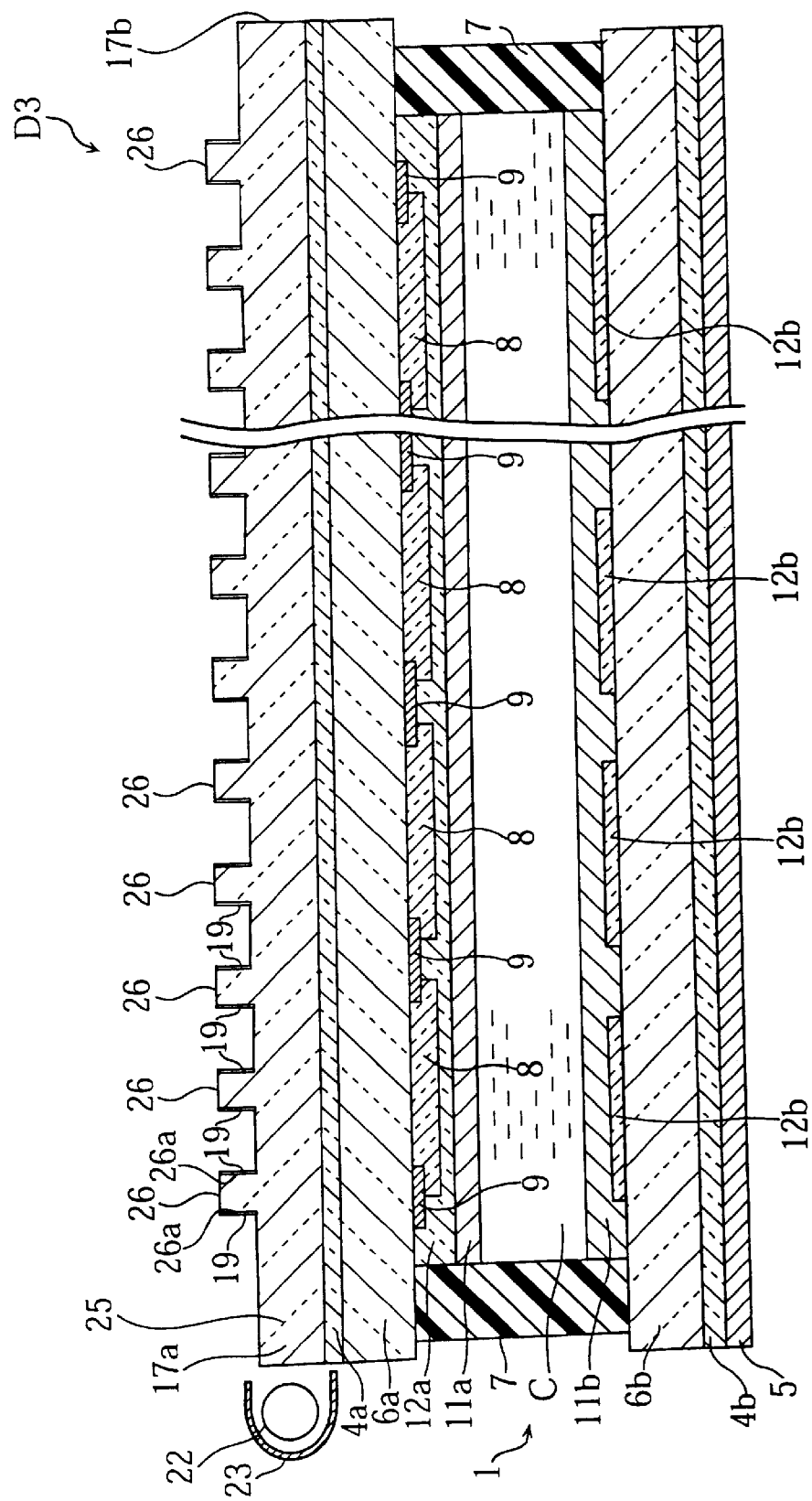
FIG. 4 is a sectional view showing a liquid crystal display apparatus in accordance with a third embodiment of the present invention.
Figure 5:
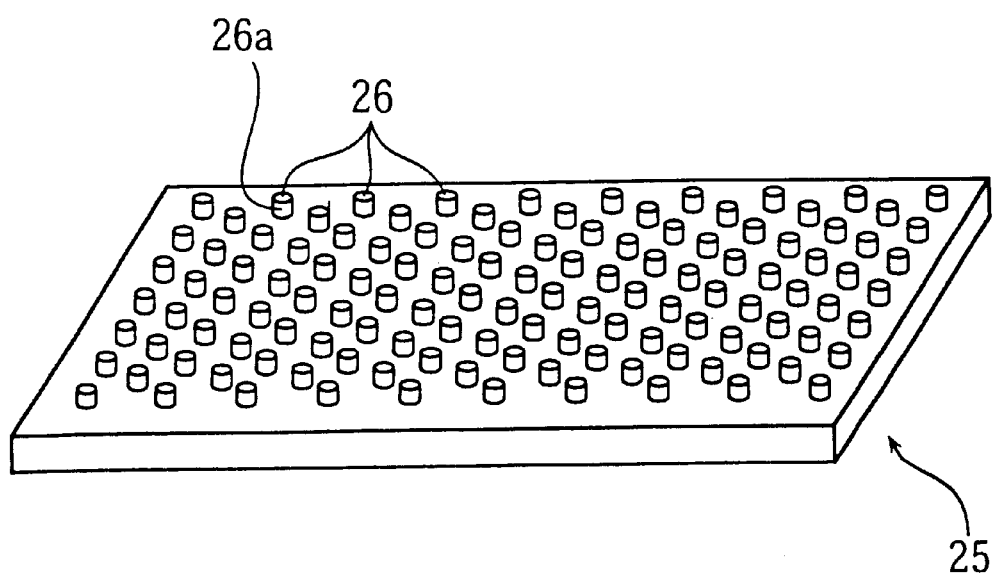
FIG. 5 is a schematic view of a light guide panel shown in FIG. 4.

In FIGS. 4 and 5 illustrate a liquid crystal display apparatus in accordance with a third embodiment of the present invention. The liquid crystal display apparatus D3 includes a light guide panel 25 which has an irregular front surface formed with a plurality of generally cylindrical projections 26. Each of the projections 26 has a circumferential side surface 26a which is provided with an absorbing layer 19 formed by applying a black coating thereon.

With the above structure, it is possible to obtain the same advantages as those obtained in the first and the second embodiments. Particularly, in the third embodiment, the projections 26 can be also provided almost all over the surface of the liquid crystal panel 1. Further, the absorbing layer 19 formed on the circumferential surface 26a of each projection 26 absorbs light incident from around the projections. Therefore, as compared with the first and the second embodiments in which the absorbing layer 19 is formed on the inclined surface, the third embodiment prevents contrast deterioration to a greater extent, which leads to further enhanced visibility.

Instead of being cylindrical, each of the projections 26 may be otherwise configured; generally conical or pyramidical for example. It is only necessary that the absorbing layer 19 be provided at such portions which do not adversely affect the visibility of the liquid crystal panel 1.

Figure 6:
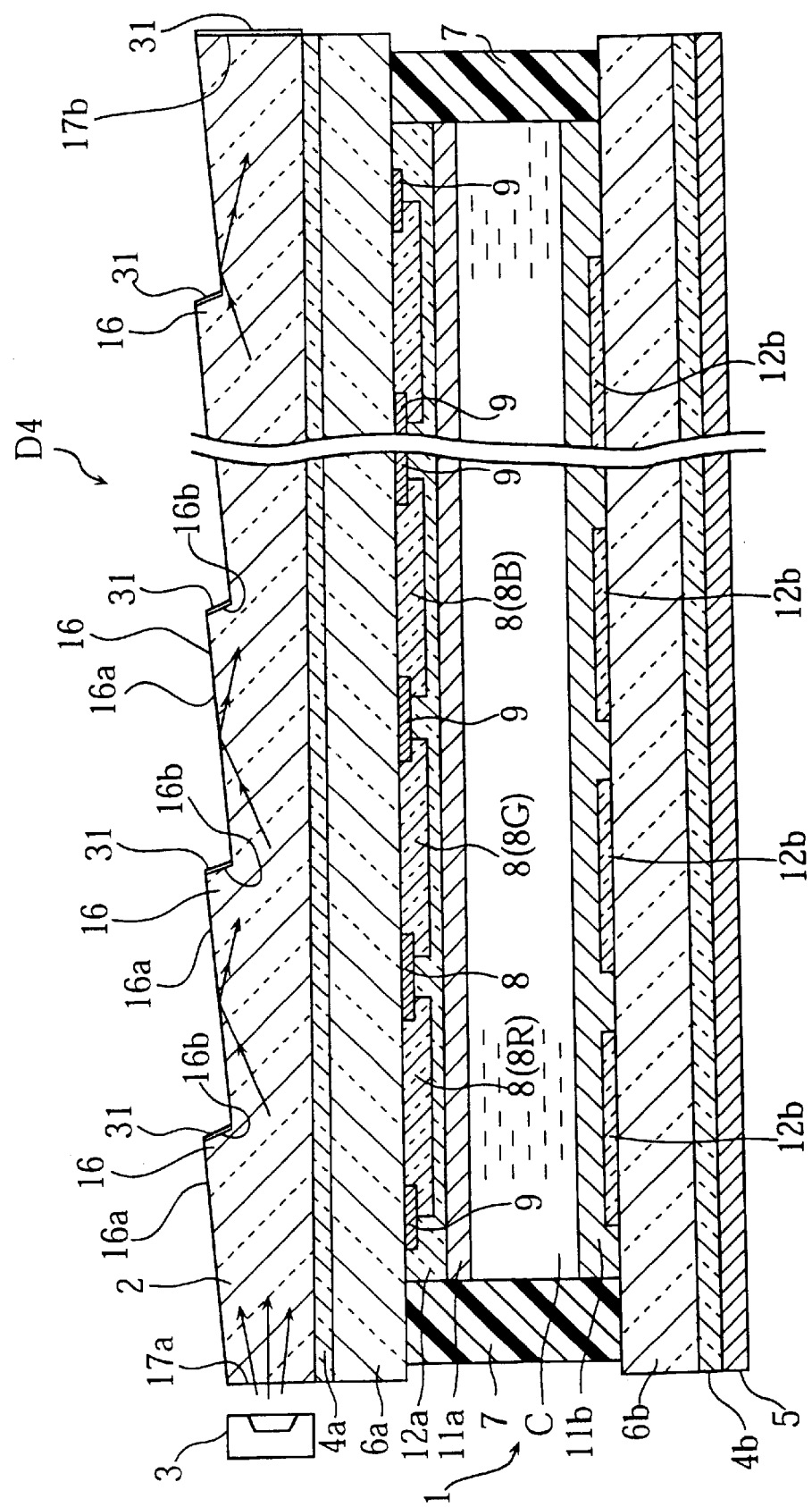
FIG. 6 is a sectional view showing a liquid crystal display apparatus in accordance with a fourth embodiment of the present invention.
Figure 7:
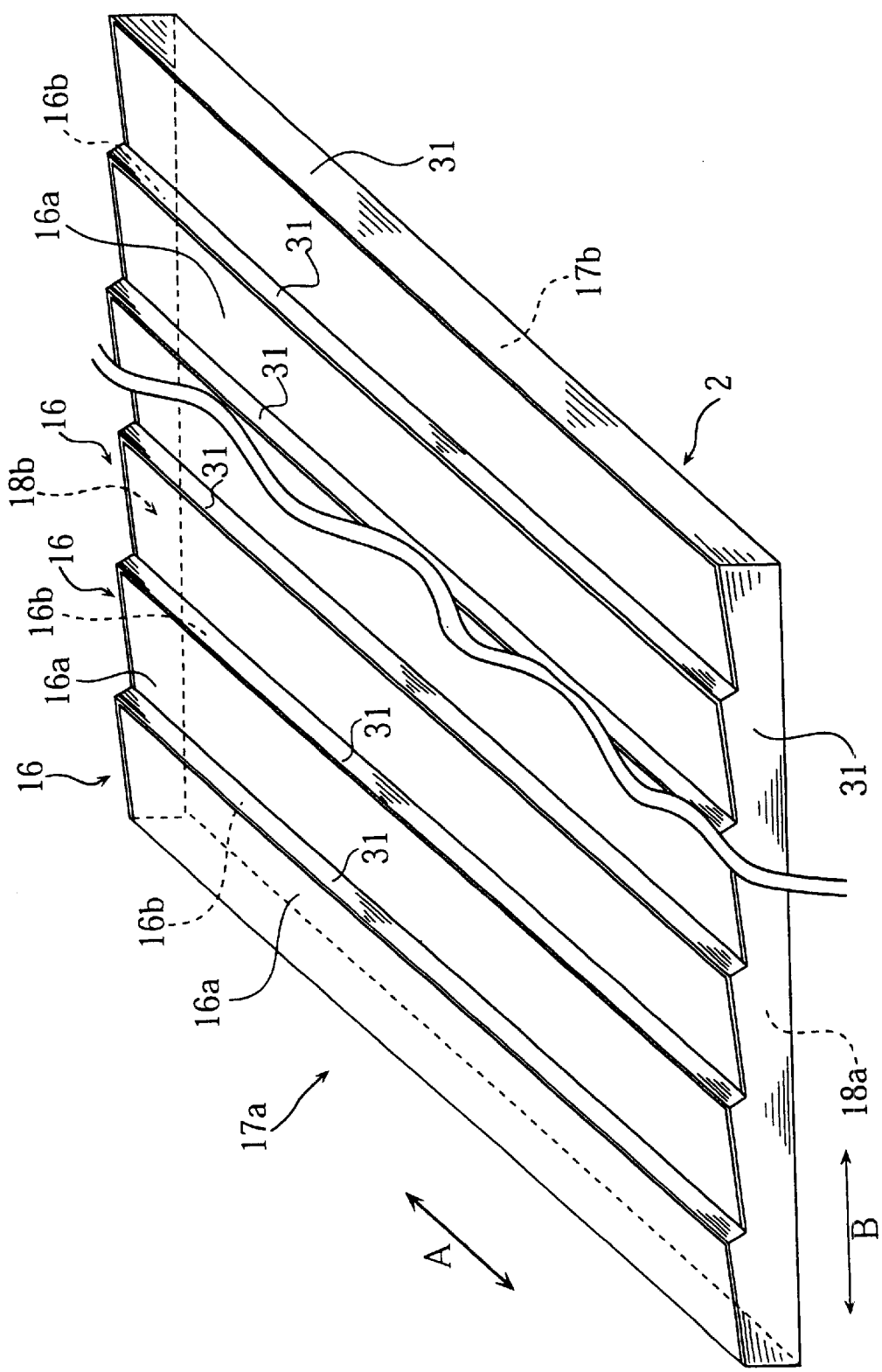
FIG. 7 is a schematic view of a light guide panel used in the liquid crystal display apparatus shown in FIG. 6.

FIG. 6 is a sectional view showing a liquid crystal display apparatus in accordance with a fourth embodiment of the present invention. The liquid crystal display apparatus D4 is similar in appearance to the liquid crystal display apparatus D1 of the first embodiment but differs therefrom in that a light storing layer 31 capable of storing light is provided instead of the absorbing layer 19. Specifically, the light guide panel 2 has projections 16 each of which has a second inclined surface 16b formed generally entirely with the light storing layer 31 which is made of a light storing coating material. The light storing coating material is also applied on the side surfaces of the light guide panel 2 other than the side surface 17a, i.e. on the side surfaces 17b, 18a, 18b, thereby providing light storing layers 31 thereon. This is because, the light storing layer on the second inclined surface 16b having a relatively large inclination angle and vertical side surfaces 17b, 18a, 18b of the light guide panel 2 have little adverse effect on the visibility of the liquid crystal panel 1. The side surface 17a facing the light source 3 is excluded to allow light from the light sources 3 to enter the light guide panel 2 efficiently.

As a light storing coating material, use may be made of pigment composed of a fluorescent substance having light storing capability. A light storing fluorescent substance excites by light energy and emits light in a dark place for a certain time. A fluorescent pigment may be prepared by adding a small amount of activator of manganese, silver, copper, or europium to sulfide, oxide, silicate, tungstate or the like of a metal having high purity such as zinc, cadmium, calcium, aluminum, or yttrium, followed by baking at high temperature. Specifically, examples of sulfate-based fluorescent pigments include ZnS(Cu), ZnS(Al), ZnS(Ag), ZnS(Cl), ZnS(Mn) and CaS(Bi). Examples of oxide-based fluorescent pigments include ZnO(Zn) and $Y_2O_3$(Eu). Examples of oxo-acid-salt-based fluorescent pigments include $CaWO_4$, $MgWO_4$, $Zn_2SiO_4$(Mn) and $BaSi_2O_5$(Pb). However, these examples are not limitative on the present invention.

The light storing coating needs not necessarily be applied to all of the second inclined surfaces 16b and the side surfaces 17b, 18a, 18b of the light guide panel 2. It may be applied at a selected surface or surfaces as required. Further, the light storing layer may be formed at a portion other than the second inclined surfaces 16b and the side surfaces 17b, 18a, 18b so long as the provision of the layer does not adversely affect the visibility. In the case where only external light is utilized, the light storing layer may be formed at the side surface 17a.

With the above-described structure, in the case where display is performed utilizing external light (e.g. sunlight or light from interior lighting) only, external light impinging on the liquid crystal display apparatus D4 is partially stored at the light storing layers 31 formed on the second inclined surface 16b and the side surfaces 17b, 18a, 18b. Moreover, when the light entering the light guide panel 2 travels within the light guide panel 2, the light is partially stored at the light storing layers 31 formed on the second inclined surface 16b and the side surfaces 17b, 18a, 18b. Further, the light traveling downwardly within the light guide panel 2 and reflected upwardly by the reflector is also stored partially at the light storing layers 31.

In the case where display is performed with the light source 3 turned on, the light emitted from the light source 3 travels within the light guide panel 2 and is stored partially at the light storing layers 31 formed on the second inclined surface 16b and the side surface 17b, 18a, 18b.

In this way, in either case where only external light is utilized or the light source 3 is turned on, the external light and the light from the light source 3 is inevitably stored partially at the light storing layers 31. When the liquid crystal display apparatus D is used in a dark place with the light thus stored, the stored light exits the light storing layers 31 to illuminate the liquid crystal panel 1. Therefore, it is possible to view the letters or the image displayed on the liquid crystal panel 1 even in a dark place.

For example, when the user of a mobile phone incorporating the liquid crystal display apparatus D4 moves from a light place to a dark place, the stored light is immediately emitted from the light storing layers 31. Therefore, the letters or the image displayed on the liquid crystal panel 1 can be viewed without any need for turning on the light source 3. Accordingly, it is possible to save power for the liquid crystal display D4 while making the mobile phone conveniently usable.

Generally, the amount of light emitted from the light storing layers 31 is relatively smaller than that of external light for example. However, in a dark place without external light, such a small amount of light from the light storing layers 31 is sufficient for viewing the letters or the image displayed on the liquid crystal panel 1 because the surroundings of the mobile phone is dark.

Figure 8:
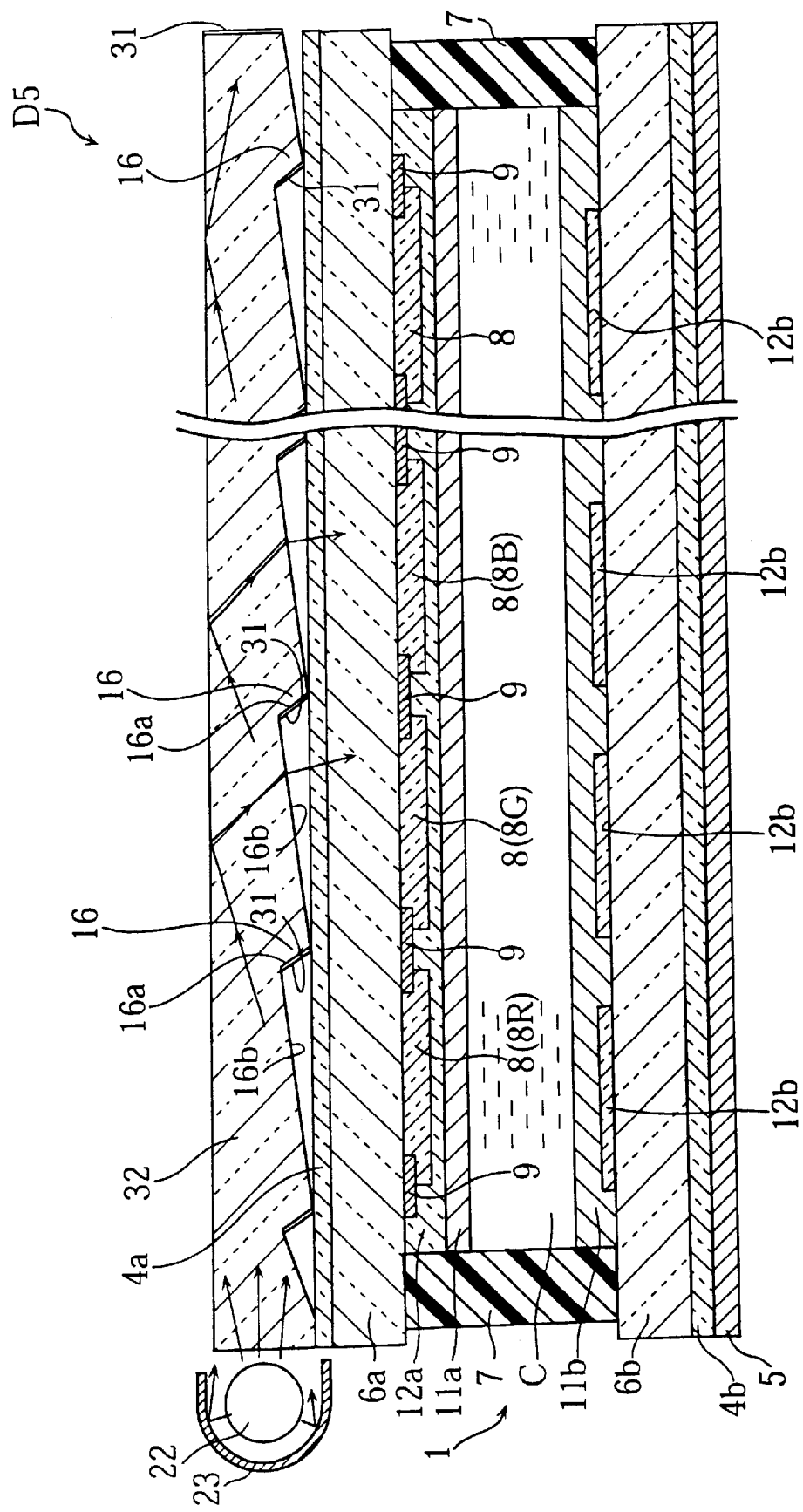
FIG. 8 is a sectional view showing a liquid crystal display apparatus in accordance with a fifth embodiment of the present invention.

FIG. 8 illustrates a liquid crystal display apparatus in accordance with a fifth embodiment of the present invention. The liquid crystal display apparatus D5 is similar in appearance to that of the second embodiment but differs therefrom in that a light storing layer 31 is provided on first inclined surfaces 16a of a light guide panel 32 and side surfaces other than the side surface facing a light source 22. Therefore, the apparatus of the fifth embodiment has the same advantages as that of the fourth embodiment.

Figure 9:
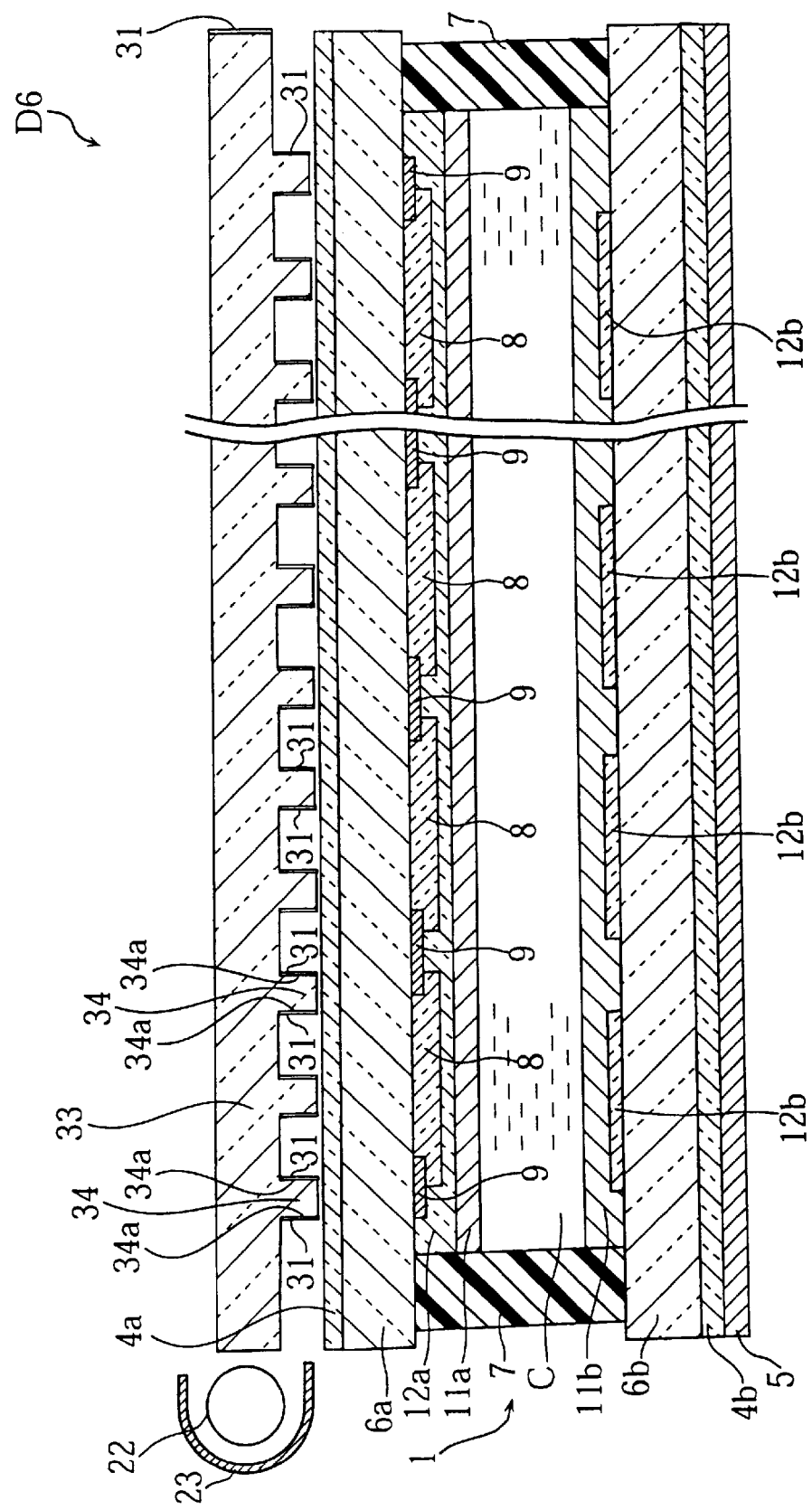
FIG. 9 is a sectional view showing a liquid crystal display apparatus in accordance with a sixth embodiment of the present invention.
Figure 10:
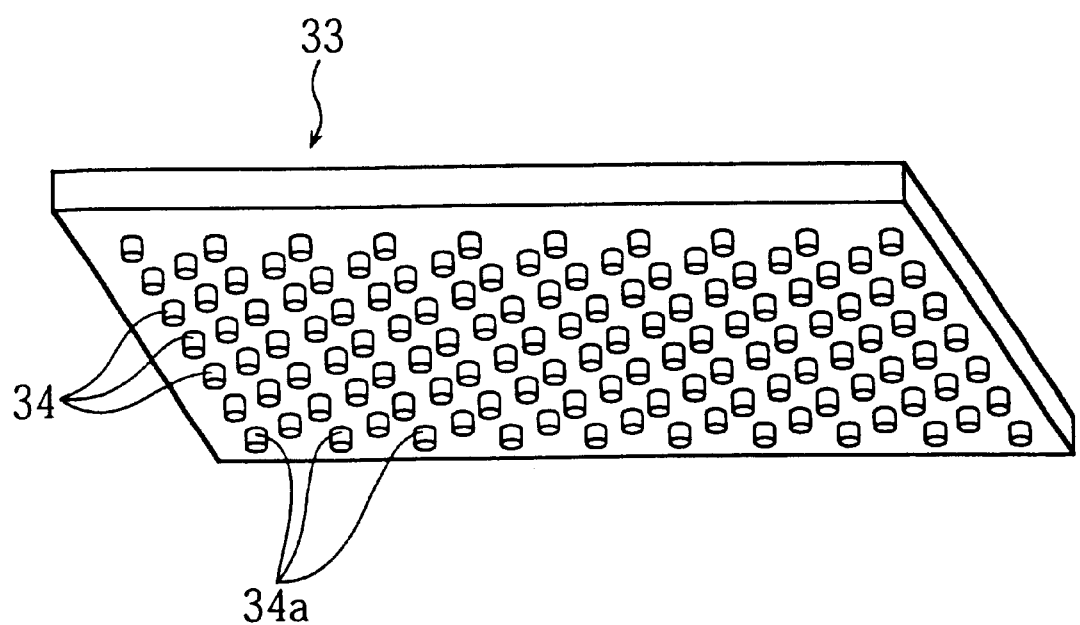
FIG. 10 is a schematic view of a light guide panel shown in FIG. 9.
Figure 11:
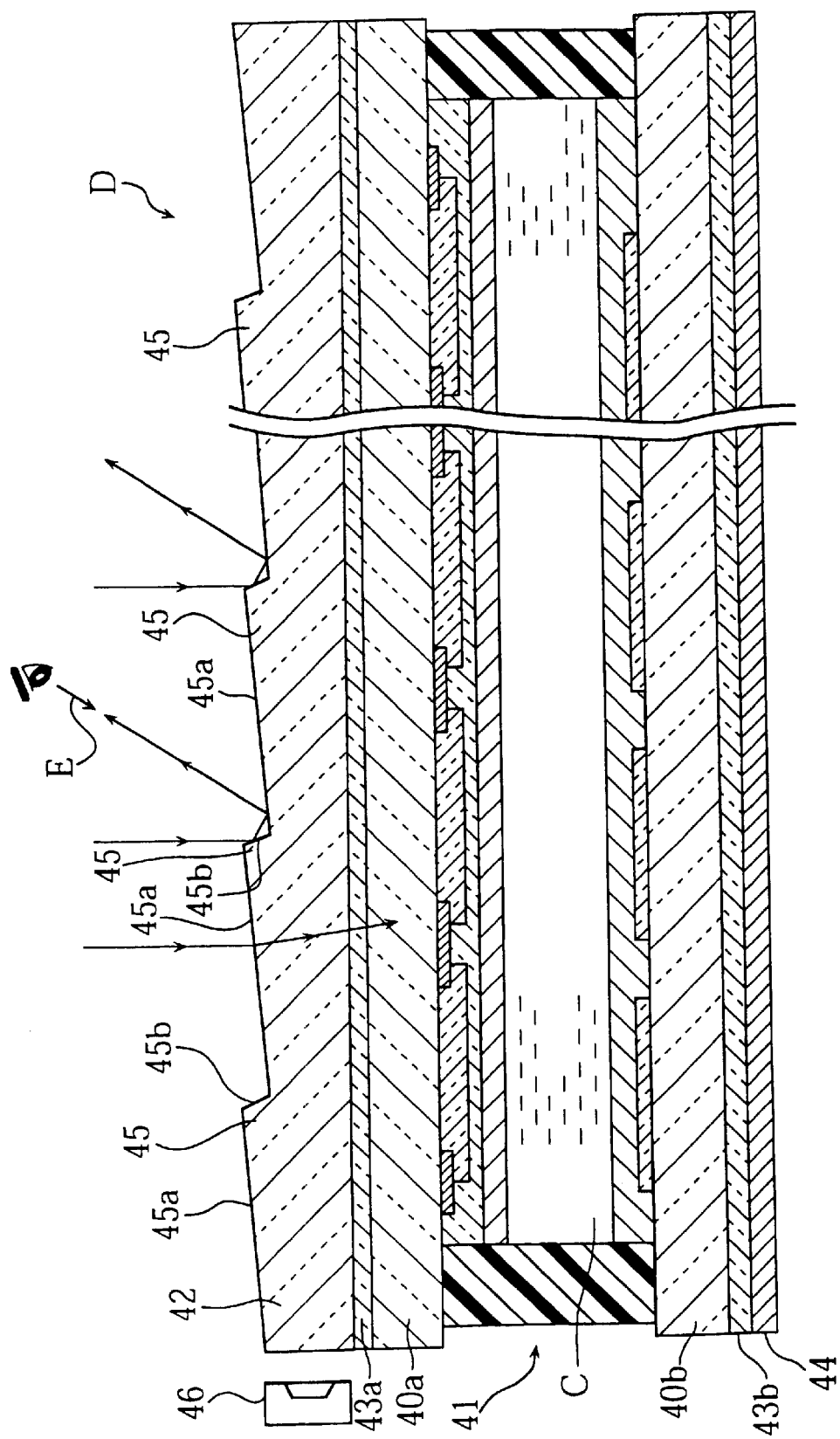
FIG. 11 is a sectional view showing an example of prior art liquid crystal display apparatus.

FIGS. 9 and 10 illustrate a liquid crystal display apparatus in accordance with a sixth embodiment of the present invention. The liquid crystal display apparatus D6 includes a light guide panel 32 which has a rear surface formed with a plurality of generally cylindrical projections 34. Each of the projections 34 has a circumferential side surface 34a which is provided with a light storing layer 31 made of a light storing coating material.

With this structure, it is possible to obtain the same advantages as those obtainable in the fourth and the fifth embodiments. Particularly, in the sixth embodiment, the projections 34 can be provided almost all over the surface of the liquid crystal panel 1. Therefore, as compared with the fourth and the fifth embodiments in which the light storing layer 31 is formed on the inclined surface, the liquid crystal panel 1 can be better illuminated, which leads to enhanced visibility.

In the fourth through sixth embodiments described above, a black coating may be applied on the inclined surfaces of the light guide panel 4 after a light storing coating is applied. Such a structure makes it possible to efficiently absorb the light from above, particularly sunlight, so that contrast at the liquid crystal panel can be further enhanced.

What is claimed is:

1. A liquid crystal display apparatus comprising:

a liquid crystal panel;

a transparent light guide panel disposed in front of the liquid crystal panel and having at least one irregular surface for emitting light entering from a light source toward the liquid crystal panel; and a reflector disposed behind the liquid crystal panel for reflecting light passing through the light guide panel and the liquid crystal panel toward the liquid crystal panel and the light guide panel;

wherein the irregular surface of the light guide panel is partially formed with a light storing layer for storing light.

2. The liquid crystal display apparatus according to claim 1, wherein the irregular surface of the light guide panel includes a plurality of projections each of which is triangular in cross section with two inclined surfaces differing from each other in direction and angle of inclination; and the light storing layer is provided at a steeper inclined surface of each projection.

3. The liquid crystal display apparatus according to claim 2, wherein the light storing layer is formed by applying a light storing coating material onto the steeper inclined surface.

4. The liquid crystal display apparatus according to claim 2, wherein the light guide panel has at least one side surface provided with a light storing layer.

5. The liquid crystal display apparatus according to claim 2, wherein the steeper inclined surface of each said projection is located farther away from the light source than the other inclined surface.

6. The liquid crystal display apparatus according to claim 2, wherein the steeper inclined surface of each said projection is located closer to the light source than the other inclined surface.

7. The liquid crystal display apparatus according to claim 1, wherein the irregular surface of the light guide panel includes a plurality cylindrical projections having a circumferential side surface on which the light storing layer is formed.

8. The liquid crystal display apparatus according to claim 1, wherein the irregular surface of the light guide panel is oriented away from the liquid crystal panel.

9. The liquid crystal display apparatus according to claim 1, wherein the irregular surface of the light guide panel faces toward the liquid crystal panel.

10. A liquid crystal display apparatus comprising:

a liquid crystal panel;

a transparent light guide panel disposed in front of the liquid crystal panel and having at least one irregular surface for emitting light entering from a light source toward the liquid crystal panel; and a reflector disposed behind the liquid crystal panel for reflecting light passing through the light guide panel and the liquid crystal panel toward the liquid crystal panel and the light guide panel;

wherein the irregular surface of the light guide panel is partially formed with an absorbing layer for absorbing external light; and wherein the irregular surface of the light guide panel faces toward the liquid crystal panel.

11. The liquid crystal display apparatus according to claim 10, wherein the irregular surface of the light guide panel includes a plurality of projections each of which is triangular in cross section with two inclined surfaces differing from each other in direction and angle of inclination; and the absorbing layer is provided on a steeper inclined surface of each projection.

12. The liquid crystal display apparatus according to claim 11, wherein the absorbing layer is formed by applying a black coating onto the steeper inclined surface.

13. The liquid crystal display apparatus according to claim 11, wherein the steeper inclined surface of each said projection is located closer to the light source than the other inclined surface.

14. A liquid crystal display apparatus comprising:

a liquid crystal panel;

a transparent light guide panel disposed in front of the liquid crystal panel and having at least one irregular surface for emitting light entering from a light source toward the liquid crystal panel; and a reflector disposed behind the liquid crystal panel for reflecting light passing through the light guide panel and the liquid crystal panel toward the liquid crystal panel and the light guide panel;

wherein the irregular surface of the light guide panel is partially formed with an absorbing layer for absorbing external light;

wherein the irregular surface of the light guide panel includes a plurality of projections each of which is triangular in cross section with two inclined surfaces differing from each other in direction and angle of inclination;

wherein the absorbing layer is provided on a steeper inclined surface of each projection; and wherein the steeper inclined surface of each said projection is located closer to the light source than the other inclined surface.

15. A liquid crystal display apparatus comprising:

a liquid crystal panel;

a transparent light guide panel disposed in front of the liquid crystal panel and having at least one irregular surface for emitting light entering from a light source toward the liquid crystal panel; and a reflector disposed behind the liquid crystal panel for reflecting light passing through the light guide panel and the liquid crystal panel toward the liquid crystal panel and the light guide panel;

wherein the irregular surface of the light guide panel is partially formed with an absorbing layer for absorbing external light; and wherein the irregular surface of the light guide panel includes a plurality of cylindrical projections each having a circumferential side surface on which the absorbing layer is formed.

* * * * *

UNITED STATES PATENT AND TRADEMARK OFFICE
CERTIFICATE OF CORRECTION

PATENT NO. : 6,577,359 B2
DATED : June 10, 2003
INVENTOR(S) : Ishihara, Takayuki It is certified that error appears in the above-identified patent and that said Letters Patent is hereby corrected as shown below:

<u>Title page,</u>
Item [22], the filing date of the application should be -- December 8, 2000 -- instead of "April 18, 2001".

Signed and Sealed this

Twenty-third Day of September, 2003

JAMES E. ROGAN
*Director of the United States Patent and Trademark Office*